US009511681B2

(12) United States Patent
Wernersbach et al.

(10) Patent No.: US 9,511,681 B2
(45) Date of Patent: Dec. 6, 2016

(54) CONTROLLED MOTION SYSTEM HAVING AN IMPROVED TRACK CONFIGURATION

(71) Applicant: ROCKWELL AUTOMATION, INC., Milwaukee, WI (US)

(72) Inventors: Glen C. Wernersbach, Cincinnati, OH (US); Marc D. Koeppel, Union, KY (US); Keith G. Jacobs, Loveland, OH (US)

(73) Assignee: Rockwell Automation, Inc., Milwaukee, WI (US)

( * ) Notice: Subject to any disclaimer, the term of this patent is extended or adjusted under 35 U.S.C. 154(b) by 267 days.

(21) Appl. No.: 14/273,976

(22) Filed: May 9, 2014

(65) Prior Publication Data

US 2014/0331888 A1 Nov. 13, 2014

Related U.S. Application Data

(60) Provisional application No. 61/821,450, filed on May 9, 2013.

(51) Int. Cl.
*B60L 13/04* (2006.01)
*B60L 13/00* (2006.01)
(Continued)

(52) U.S. Cl.
CPC .............. *B60L 13/006* (2013.01); *B60L 13/04* (2013.01); *G05B 19/4189* (2013.01);
(Continued)

(58) Field of Classification Search
CPC ........ A63C 19/10; A63G 21/02; A63G 21/04; A63G 21/06; A63G 7/00; B61B 15/00; B61B 2210/04; E01B 25/34; E01B 7/06; B60L 13/006; B60L 13/03; B60L 13/04; B60L 13/06; B60L 13/08; B60L 13/10; B65G 54/00; B65G 54/02
See application file for complete search history.

(56) References Cited

U.S. PATENT DOCUMENTS 1,020,942 A * 3/1912 Bachelet ................ H02K 41/03
104/282
5,156,093 A * 10/1992 Azukizawa ............. B60L 13/08
104/130.02
(Continued)

FOREIGN PATENT DOCUMENTS

RU 2 419 072 * 5/2011
WO 2013014990 A1 1/2013
WO 2013143783 A1 10/2013

OTHER PUBLICATIONS

European Search Report from EP No. 14 16 7750 dated Oct. 28, 2014; 10 pgs.
(Continued)

*Primary Examiner* — Mark Le
(74) *Attorney, Agent, or Firm* — Fletcher Yoder P.C.

(57) ABSTRACT

A transport system comprising linear motor modules utilized both straight and curved track modules, with movers displaced on the track modules by control of power applied to coils of the modules. Curved track modules have modified spline geometries to provide desired acceleration and jerk characteristics. The modified spline geometries may be defined by more than one generators, such as an equation generator and a spline fit between the equation-generated segment and one or more constrained points or locations. The curved track modules may be divided into 180 degree modules, or may be reduced to 90 degree, 45 degree or other fractional arcs to provide for modular assembly, mirror-image geometries and motion profiles, and the like. The
(Continued)

system may be adapted to provide improved motion characteristics based on modification of a conventional spline geometry.

20 Claims, 11 Drawing Sheets

(51) Int. Cl.
*G05B 19/418* (2006.01)
*H02K 41/03* (2006.01)
*B65G 54/02* (2006.01)

(52) U.S. Cl.
CPC .............. *H02K 41/03* (2013.01); *B65G 54/02* (2013.01); *Y02P 90/28* (2015.11)

(56) References Cited

U.S. PATENT DOCUMENTS

| | | | |
|---|---|---|---|
| 7,786,685 B2 * | 8/2010 | Schueren | H02K 41/031 310/12.01 |
| 2002/0180279 A1 | 12/2002 | Faizullabhoy et al. | |
| 2009/0132139 A1 * | 5/2009 | Takeuchi | B60W 30/18009 701/70 |
| 2014/0142792 A1 | 5/2014 | Hanaka et al. | |

OTHER PUBLICATIONS

Schrufer, Elmar; "Signalverarbeitung"; Jan. 1, 1992; Carl Hanser Verlag Munchen Wien, Muchen Wien, pp. 77-83.

* cited by examiner

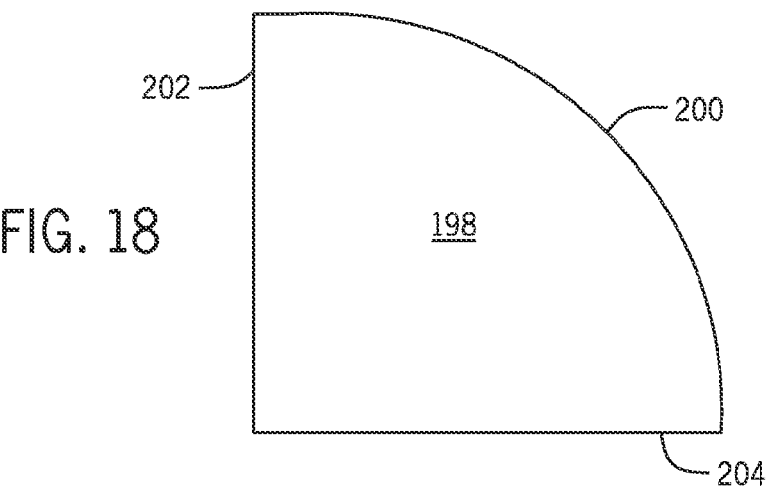
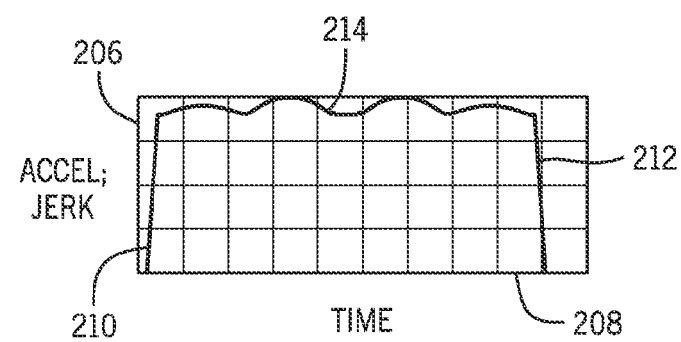
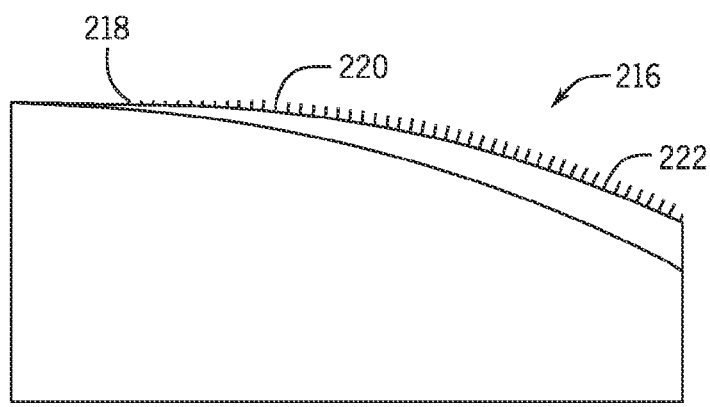

CONTROLLED MOTION SYSTEM HAVING AN IMPROVED TRACK CONFIGURATION

CROSS REFERENCE TO RELATED APPLICATIONS

This application is a Non-Provisional patent application of U.S. Provisional Patent Application No. 61/821,450, entitled "Controlled Motion System Having an Improved Track Configuration", filed May 9, 2013, which is herein incorporated by reference.

BACKGROUND

The present invention is directed to linear motor and transport systems, and, more particularly, to arrangements for providing curves and directional transition modules in such systems.

BRIEF DESCRIPTION

Transport systems, such as controlled motion systems utilizing linear drives, are used in a wide variety of processes (e.g. packaging, assembly automation, processes involving use of machine tools, etc.) and provide the advantage over conventional rotary drive systems of increasing both the speed and the flexibility of the process. In particular, linear motors operate as magnetic drives creating a changing magnetic field to directly transport the axis or transport element along a defined track, thereby eliminating various conventional axes, such as gear heads, shafts, keys, sprockets, chains and belts, used with traditional rotary drive systems. The reduction of mechanical complexity over rotary drive systems provides both reduced cost and increased speed capability by virtue of reduced inertia, compliance, damping, friction and wear. Further, controlled motion systems utilizing linear drives also provide greater flexibility than conventional rotary drive systems by allowing one or more individual axes or transport elements to be independently controlled while transporting articles along an entire track.

Unlike conventional rotary drive systems that have a single drive and typically a single rotary motor for energizing an axis or transport element for moving articles along a track, linear motion systems typically comprise interconnected track sections wherein one or more drives are electrically coupled to a plurality of transport elements and have individually controlled coils that cooperate with one or more control units to energize or de-energize the coils to create magnetic fields effective for providing controlled motion of each transport element traveling along the track. Such systems also employ sensors, such as linear encoders spaced at fixed positions along the track and sensors mounted on each transport element that cooperate with the linear encoders to provide signals to a control unit for use in determining the position of each transport element along the track.

Linear motion systems typically have tracks comprising straight sections, and where loops or more complex layouts are desired, curve sections. One problem associated with such tracks is encountered when the curvature of the track changes suddenly, such as when going from a straight part of the track to a curved part of the track. This results in the transport element experiencing a high rate of acceleration and jerk, particularly at the point of transition between straight and curved sections (and vice versa). Such abrupt changes can result in higher required motor forces, positional errors, cogging, commutation issues, and other undesirable effects on motion and control. Certain systems have adopted "spline" curves to ease some of these transitional effects, but such shapes are often less than optimal from the point of view of space utilization, envelope dimensions, flexibility in motion and force design, and so forth.

There is a need, therefore, for track assemblies and designs for controlled motion system having straight sections and curved sections whereby the acceleration and jerk experienced by a transport element traveling from a straight section of the track to a curved section and/or from traveling from a curved section to a straight section, and/or from traveling from a first curved section to a second curved section are reduced and optimized.

BRIEF DESCRIPTION

The disclosure sets forth a controlled motion system comprising a track assembly having a straight track module and a curved track module interconnected to form a continuous track, each module comprising a plurality of individually controlled electromagnet coils effective for creating electromagnetic fields. A mover is mounted for movement along the track and having magnetic reaction elements positioned that interact with the fields. The curved track module comprises a modified spline geometry comprising at least two different generators.

The disclosure also relates to controlled motion system comprising a curved track module interconnectable with other track modules to form a continuous track and comprising a plurality of individually controlled electromagnet coils effective for creating electromagnetic fields for displacing a mover along the curved track module, wherein the curved track module comprises a modified spline geometry comprising at least two different generators.

Still further, the disclosure relates to a controlled motion system comprising a curved track module interconnectable with other track modules to form a continuous track and comprising a plurality of individually controlled electromagnet coils effective for creating electromagnetic fields for displacing a mover along the curved track module; wherein the curved track module comprises a modified spline geometry comprising multiple generators, and wherein the curved track module comprises a 90 degree module with a modified spline geometry that is symmetrical about a 45 degree centerline.

DRAWINGS

These and other features, aspects, and advantages of the present disclosure will become better understood when the following detailed description is read with reference to the accompanying drawings in which like characters represent like parts throughout the drawings, wherein:

FIG. 18 is a schematic representation of a portion of a curved track module of a track assembly having another modified spline smoothed curve track geometry;

FIG. 19 is a graphical representation of linear acceleration of an object traveling from a straight track module to and along the curve track module of FIG. 18 of the track assembly;

FIG. 20 is a schematic representation graphically depicting curvature of the curved track module of FIG. 18;

DETAILED DESCRIPTION

Figure 1A:
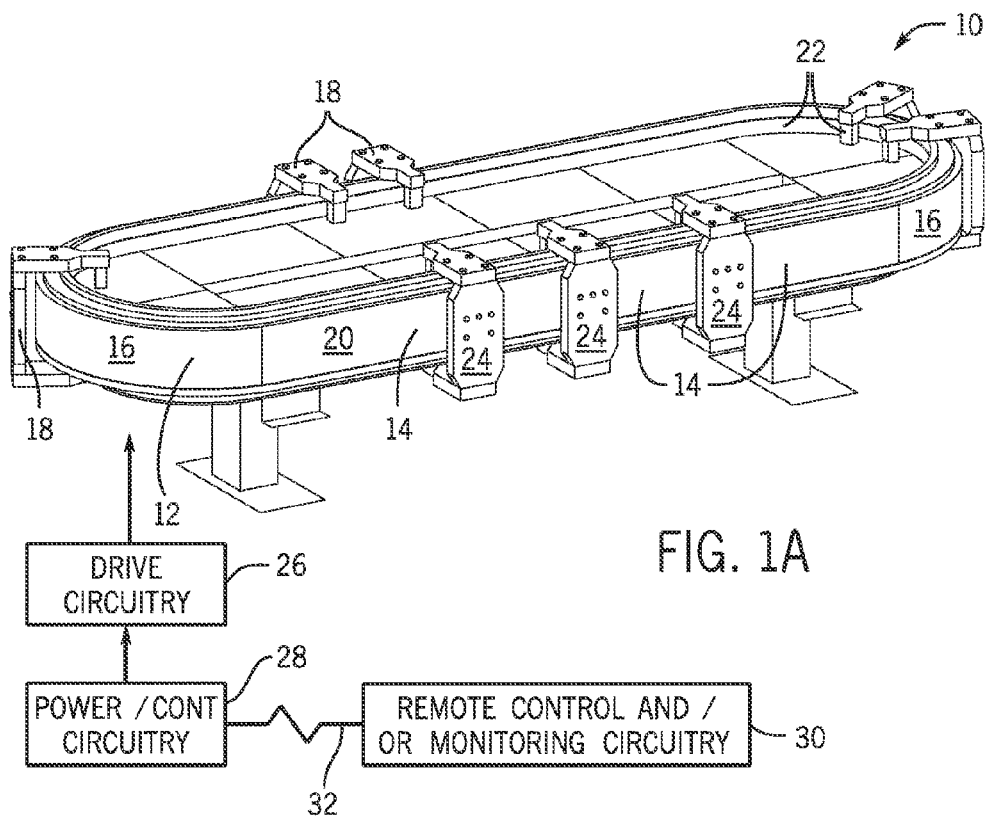
FIG. 1A is a perspective view of an exemplary transport system illustrating straight and curved track modules and several movers positioned for movement along the modules.

Turning now to the drawings, and referring first to FIG. 1A, a transport system 10 as illustrated for moving articles or products around a track 12. As will be appreciated by those skilled in the art, in many applications, the transport system will be configured to inter-operate with other machines, robots, conveyers, control equipment, and so forth (not separately shown) in an overall automation, packaging, material handling or other application. The transport system itself generally comprises a "linear motor" system as discussed below, in which the moving components are positioned, accelerated, decelerated, and generally moved under the influence of controlled magnetic and electromagnetic fields. In the illustrated embodiment, the track 12 comprises straight track modules 14 and curved track modules 16. These modules may be generally self-contained and mountable in various physical configurations, such as the oval illustrated in FIG. 1A. It should be noted that other configurations are equally possible as discussed below. The configurations may form closed loops of various shapes, but may also comprise open-ended segments. The system further comprises one or more movers 18 which are mounted to and movable along the track. Again, the position, velocity, acceleration, and higher order derivative parameters are controllable for these movers by appropriate control of the coils of the system that are energized and de-energized as discussed below. In the illustrated embodiment, the movers 18 interact with stationary elements in and around an outer periphery 20 of the track modules, although other configurations are envisaged. A sensor system 22 is provided to detect positions of the movers around the track, and such center systems may comprise permanent magnets, energized coils, Hall effect sensors, or any other suitable devices. In general, one component of the sensor system will be mounted on the movers, while another component will be mounted at fixed locations around the track.

Each mover further comprises a mounting platform 24. In an actual implementation, various tools, holders, support structures, loads, and so forth may be mounted to this mounting platform. The movers themselves may be configured differently from those shown in order accommodate the various loads. While a horizontal configuration is illustrated in FIG. 1A, other orientations may also be provided, such as ones in which the illustrated oval is generally stood on a side or end, or at any angle between.

The system further comprises circuitry for controlling a movement of the movers. In the embodiment illustrated in FIG. 1A, this circuitry includes a drive circuitry 26 that provides signals to each track module, and specifically individual coils (see below) of the track modules to create electromotive forces that interact with magnets on the modules to drive the modules to specific locations, and at specific velocity, accelerations, and so forth. This drive circuitry may typically include inverter circuitry that makes use of power electronic switches to provide drive power to the individual coils of each module in a controlled manner. In some embodiments, the drive circuitry may be included in each individual module, and signals provided to the drive circuitry by power and control circuitry 28. This power and control circuitry (and the drive circuitry) may receive feedback from the movers and/or from the sensor system to detect the location, velocity, acceleration, and so forth of each mover. In certain embodiments the movers may also be configured to be recognized by the power and control circuitry 28 as individual axes that are independently controlled, but with regulation of their position, velocity and acceleration to avoid conflicts, collisions, and so forth. The particular motion profile implemented by the power and control circuitry 28 will typically be configured and implemented upon the design and commissioning of the system, here again, depending upon the particular task to be performed. Finally, various remote control and/or monitoring circuitry 30 may be provided and this circuitry may be linked to the system by one or more networks 32. Such remote circuitry may generally allow for coordination of the operation of the transport system with other automation components, machine systems, manufacturing and material handling machines, and so forth.

Figure 1B:
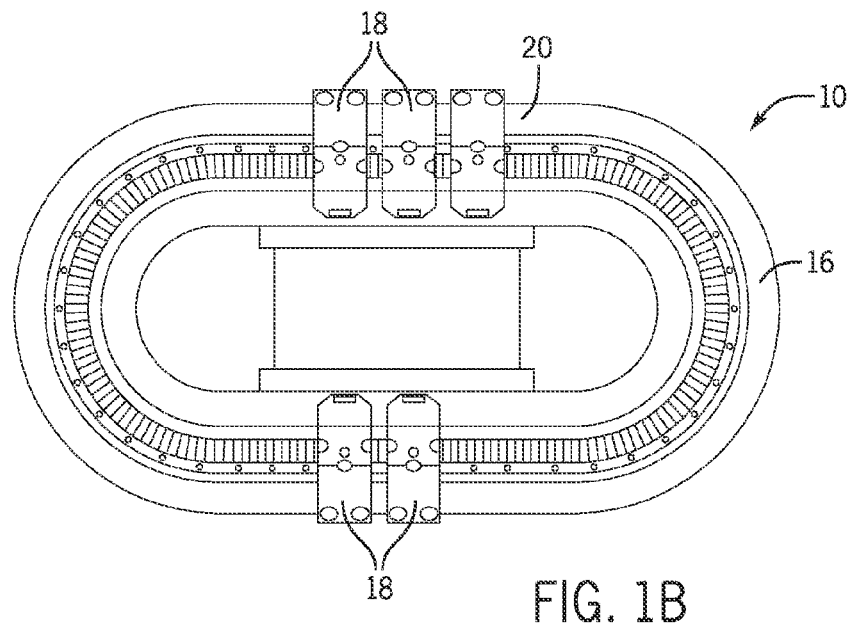
FIG. 1B is a top view of a similar transport system in which motor coils are positioned differently than in the system of FIG. 1A.

FIG. 1B illustrates an alternative configuration for a similar transport system. However, in this configuration, rather than motor coils being positioned around the periphery of the system, coils are positioned around the top of the system, in a generally planar arrangement. Magnet assemblies of each mover 16 face these coils and are spaced from the coils by a small air gap. Straight and curved track modules are assembled, as above, to form an oval, although other shapes and layouts may be formed. The curved track modules may be adapted with modified spline geometries, as in the case of the system shown in FIG. 1A, and as described in greater detail below.

Figure 2:
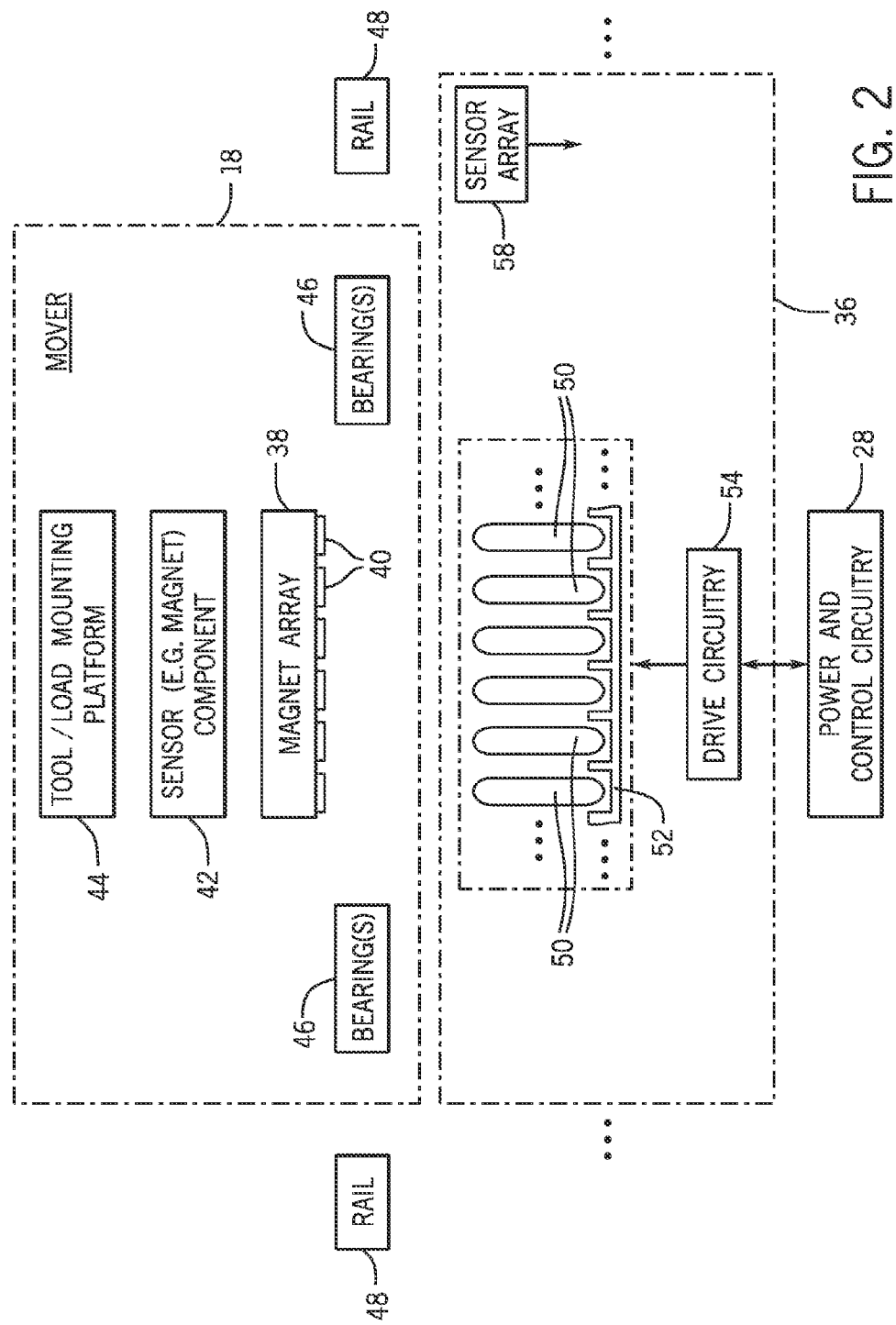
FIG. 2 is a diagrammatical representation of the system of FIGS. 1A and 1B.

FIG. 2 is a diagrammatical representation of the transport system showing one track module 36 and one mover 18 positioned along the track module. The track module illustrated in FIG. 2 may be a straight or curved track module, these two differing in their physical configuration, and certain of the actual characteristics owing to the curved nature of the curved modules as discussed below. In general, however, each mover comprises a magnet array 38 on which a number of magnets 40 are mounted. These will typically be permanent magnets and are mounted such that a small air gap is provided between the magnets and coils of the track module described below. As shown in FIG. 2, the track module 36 further comprises a sensor component 42, such as a permanent magnet. It should be noted, however, that the particular sensor component included in the track module will depend upon the nature of the sensing strategy, the sensing resolution, the position of the sensor on the mover (and cooperating components on the track module), and so forth. The platform 44 is provided on the mover while mounting tools and the like as discussed above. Finally, bearings and associated components (e.g., rollers) are mounted to the mechanical structure of the mover and serve to interact with one or more rails, as indicated by reference numerals 46 and 48, respectively. These bearings and rails allow the mover to remain securely attached to the track modules while allowing relatively free movement of the movers along the track modules and supporting mechanical loads and forces encountered during motion.

The track module 36 will typically include a series of parallel coils 50 that are associated with a stator or armature 52. In currently contemplated embodiments, these coils are mounted into slots in the stator, and the stator itself may be made of magnetic material formed into a stack of laminates and structured to allow for mounting within the track module housing. Particular configurations, magnetic, mounting structures and the like of the coils and stator components are generally beyond the scope of the present disclosure. Drive circuitry 54 may be included in each module as discussed above to allow for controlled power signals to be applied to the coils in order to drive and position the movers appropriately around the track module. Finally, a sensor array 56 is provided in each track module to allow for interaction with the sensor components of the movers. This sensor array will typically provide feedback that can indicate the position of the movers, and can be used to derive velocity, acceleration, jerk and other motion parameters. In the illustrated embodiment a plurality of track modules may be mounted end-to-end and interconnected with one another and/or with the power and control circuitry to received signals used to power the coils.

As will be appreciated by those skilled in the art, track modules, along with the magnet arrays of the movers, will generally form what may be considered a linear motor system. That is, electromotor force is generated by the controlled fields of the coils and interaction between these fields and the magnetic fields of the magnet array serve to drive the mover into desired positions, at desired speeds, and so forth. As noted above, these coils and the linear motor itself may be designed in accordance with various configuration strategies, such as ones having the coils arranged around a periphery of the track modules, ones in which the coils are generally planar (in a top or bottom position of the modules), and so forth. Although the "linear" motor system may be used in the present disclosure, it should be appreciated that curved modules in various configurations are intended to be included under this rubric.

Figure 3A:
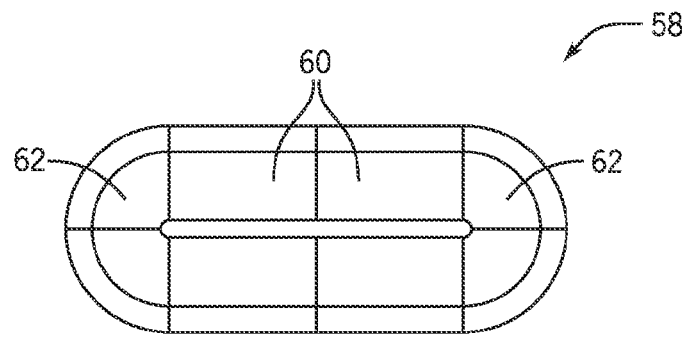
FIGS. 3A-3C are top views of exemplary alternative layouts for such systems, utilizing both straight and curved track modules.
Figure 3B:
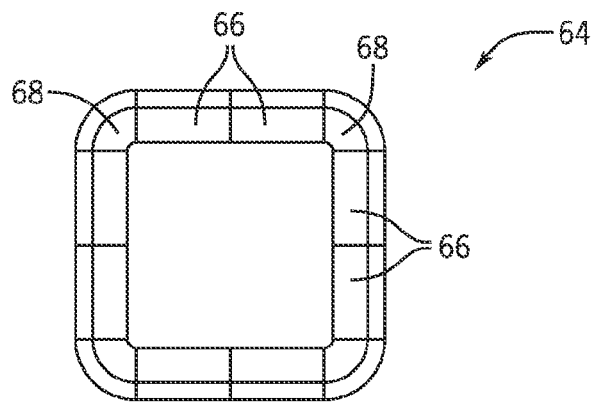
Figure 3C:
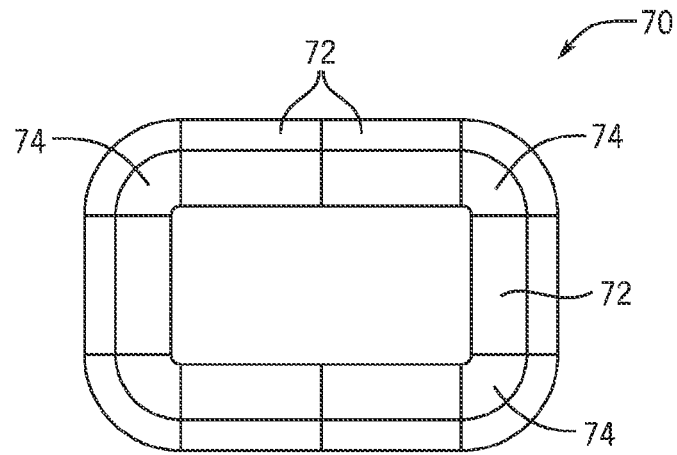

In addition to the configurations shown in FIGS. 1A and 1B, various other physical layouts may be employed, such as those shown in FIGS. 3A, 3B and 3C. FIG. 3A illustrates a transport system having an oval configuration 58. Here the configuration is made of several straight modules 60 and end modules 62 that form 180 degree curves. Any number of straight modules may be provided, and as described more fully below, the curved modules may be provided in a single unit forming 180 degrees to close the oval or in smaller units of 90 degrees, 45 degrees, 30 degrees, and so forth. As shown in FIG. 3B, square configurations 64 may be similarly formed by insertion of straight modules 66 between 90 degree modules 68. In the rectangular configuration 70 of FIG. 3C, straight modules 72 are inserted between 90 degree modules 74, with a different number of straight modules on each side to form a generally rectangular configuration. Other configurations may include various turns, interior and exterior curves, S-shapes, open-ended track sections, and so forth.

It should also be noted that a number of different coil and magnet configurations may be employed with the innovations summarized in the present disclosure. These may include, for example, the peripheral coil and facing magnet arrangements discussed above, and the generally planar coil arrangements with facing magnet arrangements also discussed above. Other arrangements may include opposing coils and/or magnets, with the cooperating magnets/coils in facing relation, T-shaped magnet and/or coil structures, and so forth.

Figure 4:
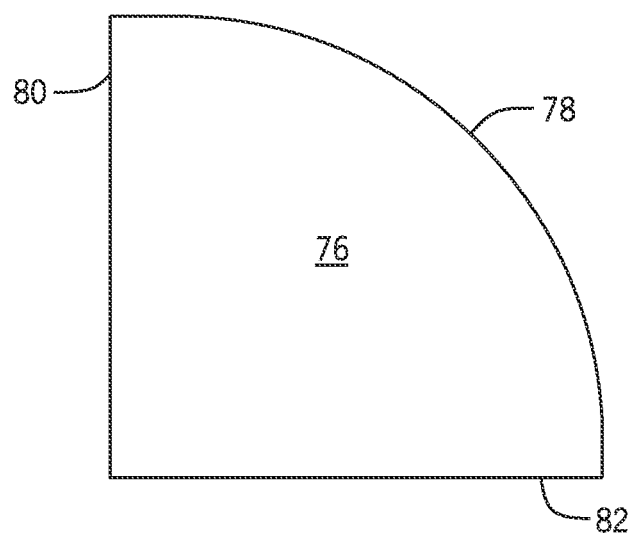
FIG. 4 is a schematic representation of a portion of a prior art curved track module of a track assembly having a generally constant radius track geometry.
Figure 5:
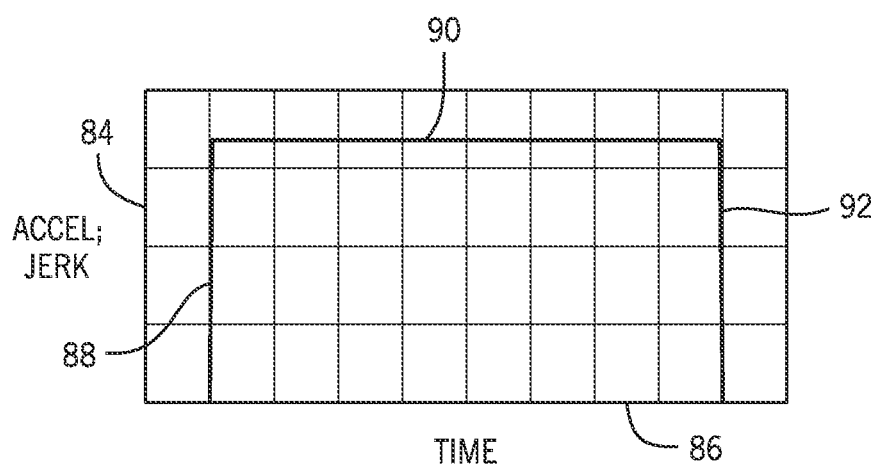
FIG. 5 is a graphical representation of linear acceleration of an object traveling from a straight track module to and along the curved track module of FIG. 4.

As discussed in greater detail below, the curved track modules of the transport system are configured with a modified spline geometry that allows for improved control of acceleration, jerk, general movement of the movement of the movers around the curved sections, and so forth. Certain prior art systems included curved track modules as illustrated in FIG. 4. These curved track modules 76 have a generally constant radius geometry 78 from an entry end to an exit end. Owing to the sudden change from a straight module to this constant radius geometry, a sudden and very high rate of acceleration and jerk were encountered as indicated in the graphical representation of FIG. 5. FIG. 5 illustrates the acceleration and/or jerk along a vertical axis 84 plotted against time along axis 86. The sudden high rate of acceleration and jerk as indicated by reference numeral 88 corresponds to the transition between the straight track module and the constant-radius curved-track module. Thereafter, acceleration and jerk where are generally steady as indicated by reference numeral 90, followed by a rapid change (deceleration) indicated by reference numeral 92. Such changes may adversely affect performance of the system, and particularly may require higher motor forces, and in part higher loads on the movers, tracks, rails, loads, and so forth.

As provided by the present disclosure and through various alternative configurations discussed below, the curved track modules have modified spline configurations that deviate from the constant radius geometries of the prior art. As will be appreciated by those skilled in the art, a spline, as used in the present context, may comprise various non-constant radius geometries, such as cubic splines, Euler curves, clothoid curves, and so forth. More particularly, in certain embodiments disclosed, the modification of the spline is accomplished by combination of two or more curve geometries, such as a cubic parabolic shape with a fit spline transition. The term "modified" is intended to convey that the spline geometries are not simply single-equation clothoid, Euler curves, or any single spline geometry, but are modified to provide controlled curvature, acceleration, jerk, and other motion parameters. In particular, the modified splines described may allow for controlled entry into the curved modules, controlled exit, controlled accelerations and jerks between the entry and exit, flattened sections that approach or equal a straight transition to allow for symmetry about a 90 degree centerline, about a 45 degree centerline, and so forth. The modified splines may also allow for flattening at end regions of a looped track to permit reduced footprint and envelope dimensions overall.

In certain embodiments described below, at least two generators are utilized for defining the modified spline geometries. By "generator" is intended the mathematical or algorithmic basis for defining the shape of the spline. For example, some of the embodiments may be at least partially based on a cubic parabolic equation, a clothoid equation, or any other equation-based shape generator. Other segments of the spline may be based on other, different equations, while some may be based on spline "fits" between constrained points, slopes, tangents, contours, curvatures, and so forth. In some embodiments, for example, an equation generator (such as a cubic parabolic equation) may be used to initiate and/or end the spline geometry, while a fixed point or location may be used to perform a spline fit between a selected end location of the equation-generated segment and the fixed point or location. In many applications, moreover, it may be useful for the fit segment to conform to particular arc length constraints, overall envelope dimensions, and so forth. Motion profiles resulting from the modified spline geometries may also be considered as constraints in the modification. Other constraints may include, for example, the layout and design of bearings and rollers of the movers (e.g., movement of the center of mass of the movers will typically differ from the movement of each bearing or roller owing to the spacing and position of the bearings and rollers, the layout of guide rails located adjacent to the track modules, and so forth).

Figure 6:
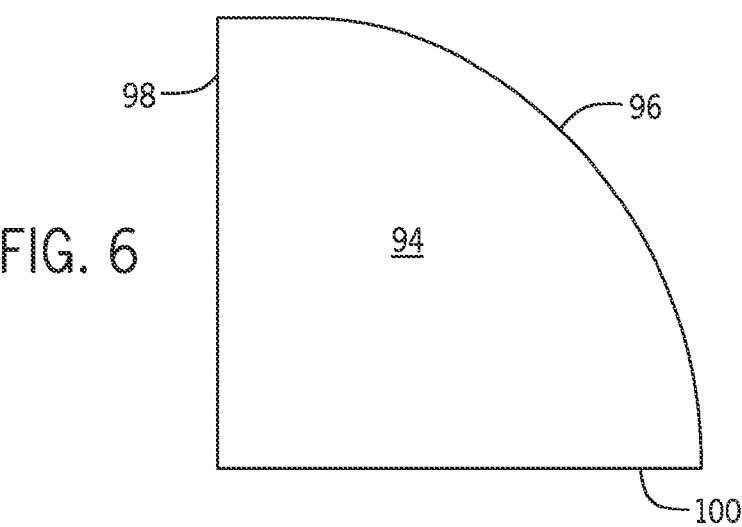
FIG. 6 is a schematic representation of a portion of a curved track module of a track assembly having a modified spline smoothed curve track geometry.
Figure 7:
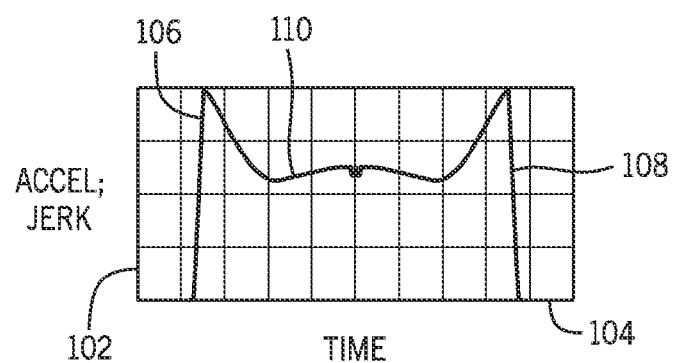
FIG. 7 is a graphical representation of linear acceleration of an object traveling from a straight track module to and along the curve track module of FIG. 6 of the track assembly.
Figure 8:
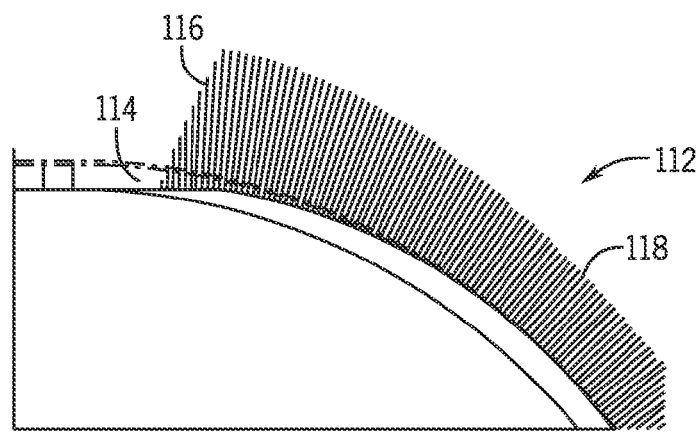
FIG. 8 is a schematic representation graphically depicting curvature of the curved track module of FIG. 6.

FIGS. 6, 7 and 8 illustrate a first modified spline configuration and characteristics associated with it. In this configuration, the curved track module 94 has a modified spline geometry 96 from an entry end to an exit end 100. It should be noted, however, throughout the present disclosure, that the terms "entry" and "exit" are somewhat arbitrary insomuch as the mover may enter from one direction and exit from the other, or in a contrary fashion, movers may be controlled to move in opposite direction. The modified spline geometry 96 shown in FIG. 6 generally corresponds to a clothoid curve, but that has been flattened toward the exit end 100 to allow for control of the overall envelope or lengthwise dimension of a turn. It may also be noted that the curved track module 94 generally forms only half of a 180 degree turn. Similar geometries, including modified (flattened) splines may be formed for full 180 degree turns, or for any fractional angular turn in the module. As illustrated in FIG. 7, the acceleration or jerk 102, plotted along a time axis 104 allows for a more gradual onset or acceleration 106 and a more gradual deceleration 108 entering and exiting the turn, with a controlled profile 110 therebetween. (Note that the graphical representation of FIG. 7, and of similar figures discussed below actually represent acceleration, while jerk is simply the slope (next derivative) of this acceleration profile. Also note that the graphical representation of FIG. 7, and again of similar figures discussed below, is for a 180 degree turn, with the evident symmetry resulting from side-by-side placement of self-similar or mirror image 90 degree modules with smooth transitions at the point of mating.) The more gradual acceleration and jerk are caused by the curvature illustrated in FIG. 8. This curvature 112 here is shown with the modified spline shape as a basis for lines of curvature radiating outwardly indicating the degree of curvature. The initiation (or completion) of the curvature as indicated by reference numeral 114 corresponds to the transition between the straight section (e.g., and adjacent straight track module) and a boundary curvature 116 which causes the acceleration (or deceleration depending upon the direction of movement) of the mover. Thereafter, the controlled spline curvature 118 allows for control of the acceleration and jerk corresponding to the controlled profile 110 of FIG. 7. By flattening, shaping, or otherwise deviating from the constant-radius geometry and from the conventional clothoid geometry, specific acceleration and jerk profiles, and corresponding performance may be obtained.

Figure 9:
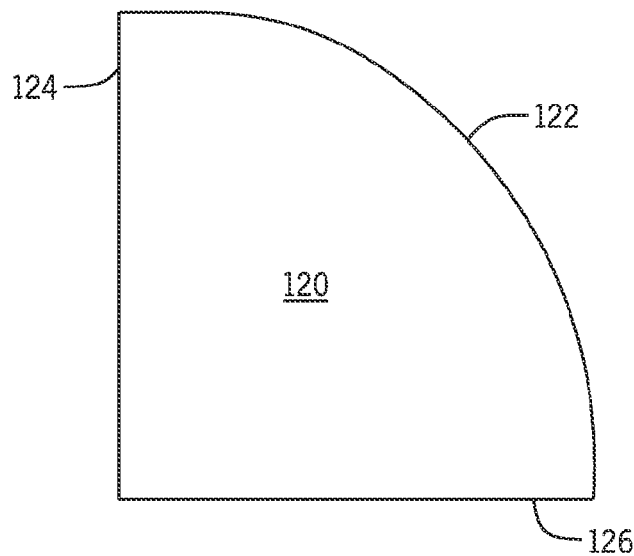
FIG. 9 is a schematic representation of a portion of a curved track module of a track assembly having another modified spline smoothed curve track geometry.
Figure 10:
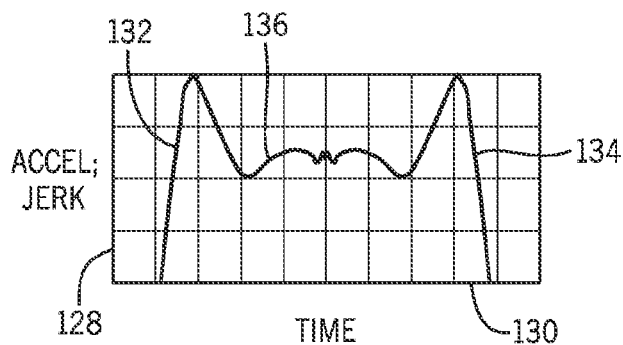
FIG. 10 is a graphical representation of linear acceleration of an object traveling from a straight track module to and along the curved track module of FIG. 7 of the track assembly.
Figure 11:
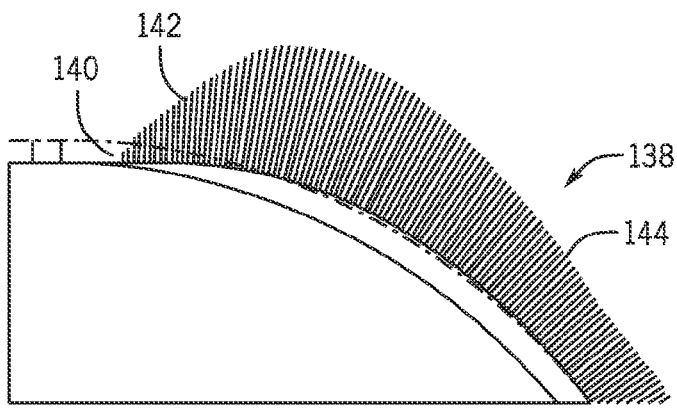
FIG. 11 is a schematic representation graphically depicting curvature of the curved track module of FIG. 9.

FIGS. 9, 10 and 11 illustrate a second alternative modified spline configuration and corresponding performance parameters. The curve track module 120 here has a second modified spline geometry 122 from an entry end 124 to an exit end 126. Here further modification of the curvature has been made to further control the acceleration and jerk profiles seen by a mover. The acceleration and jerk 128, plotted along time axis 130 illustrated in FIG. 10 here provide for a more gradual acceleration 132 followed by a more gradual deceleration 134 and a controlled profile 136 therebetween. The further modification of the spline here allows for an inflection near the upper end of the acceleration portion of the profile (near the top of the generally linear acceleration 132) and a corresponding inflection or change for the deceleration 134. The controlled profile 136 may allow for deceleration between the ends, with acceleration and other controlled movement therebetween. It can also be seen that this profile has been altered from that shown in FIG. 7 by a somewhat more steep deceleration following the initial acceleration, a somewhat more steep acceleration prior to the exit end, and so forth. These motion characteristics provided by the curvature 138 illustrated in FIG. 11.

Here the initiation (or completion) of the curvature 140 allows for a somewhat more smooth transition or boundary curvature 142 as compared to that of FIG. 8. Thereafter, the modified spline allows for somewhat reduced curvature in the controlled spline curvature section 144. Such curvature and modification can be designed to provide for smoother ramps of acceleration and jerk, and smoother or certain desired movement characteristics around the turn.

Figure 12:
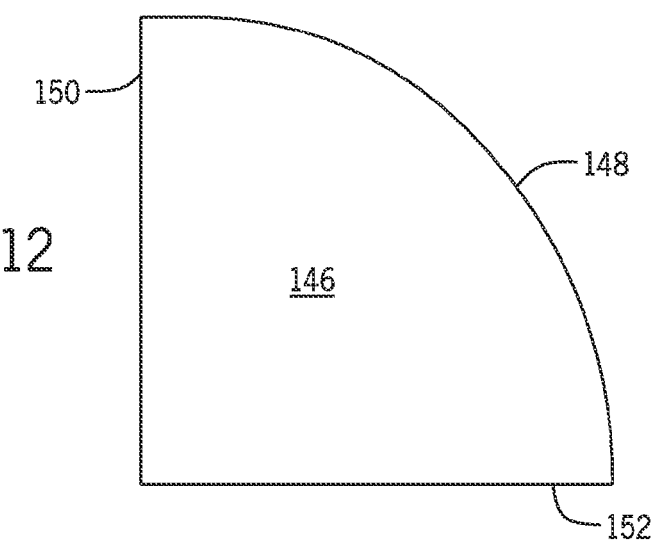
FIG. 12 is a schematic representation of a portion of a curved track module of a track assembly having another modified spline smoothed curve track geometry.
Figure 13:
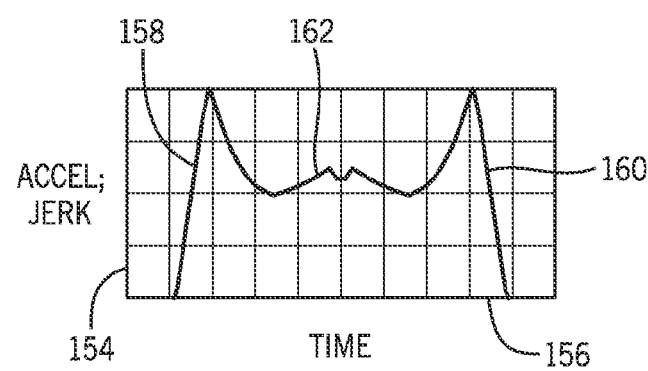
FIG. 13 is a graphical representation of linear acceleration of an object traveling from a straight track module to and along the curved track module of FIG. 12 of the track assembly.
Figure 14:
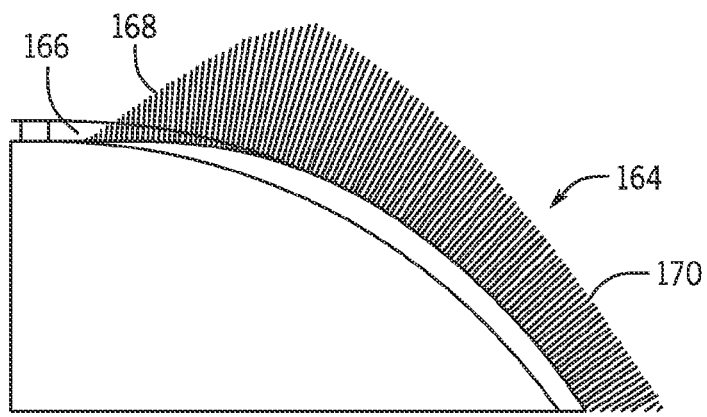
FIG. 14 is a schematic representation graphically depicting curvature of the curved track module of FIG. 12.

A third modified spline geometry as illustrated in FIG. 12 with performance characteristics illustrated in FIGS. 13 and 14. Here the curved track module 146 has a modified spline geometry 148 between an entry end 150 and an exit end 152. The resulting acceleration and jerk 154, plotted at along time axis 156 provide for an even more gradual acceleration and jerk 158 and an even more gradual deceleration and jerk 160, with a controlled profile 162 therebetween. Here again, the acceleration and jerk result from the curvature 164 of the modified spline geometry from the initiation (or completion) point 166 through a curvature ramp 168, followed by the controlled spline profile 170.

Figure 15:
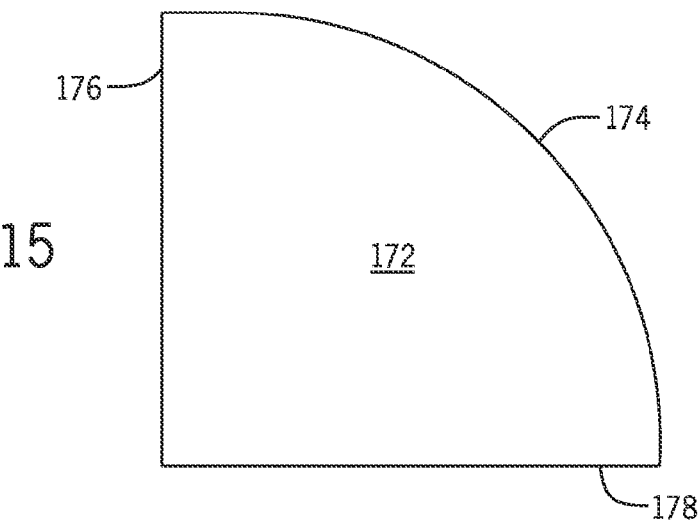
FIG. 15 is a schematic representation of a portion of a curved track module of a track assembly having another modified spline smoothed curve track geometry.
Figure 16:
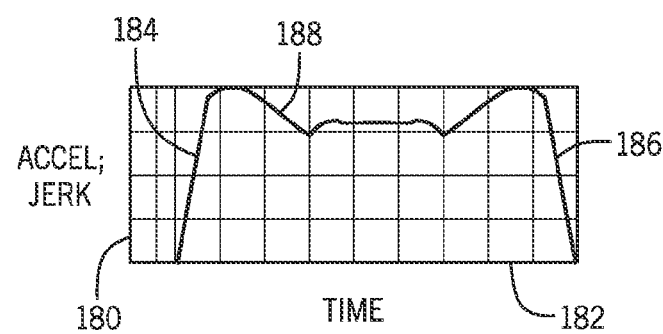
FIG. 16 is a graphical representation of linear acceleration of an object traveling from a straight track module to and along the curve track module of FIG. 15 of the track assembly.
Figure 17:
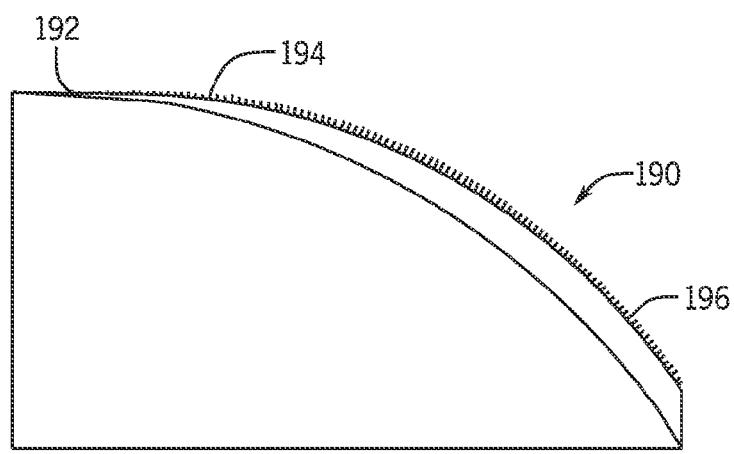
FIG. 17 is a schematic representation graphically depicting curvature of the curved track module of FIG. 15.

A further example of such modified splines is illustrated in FIGS. 15, 16 and 17. Here, the curved track module 172 has a modified spline geometry 174 from an entry end 176 to an exit end 178. As shown in FIG. 16, the acceleration and jerk 180, plotted against time 182 provides for a gradual acceleration 184 and a gradual deceleration 186 with a more flattened controlled profile 188 therebetween. Here again, the deceleration, motion profile, and acceleration provided in the controlled profile segment can be modified by adapting the curvature 190 as indicated in FIG. 17. The curvature here again begins to deviate from the straight segment at the initiation (or completion) point 192, followed by boundary curvature 194 and the controlled spline curvature 196.

A further or fifth modified spline configuration is illustrated in FIG. 18, along with its performance characteristics shown in FIGS. 19 and 20. Here the curved track section 198 has a modified spline geometry 200 from an entry end 202 to an exit end 204. The spline geometry 200 has been modified to provide an acceleration and jerk 206 against time 208 that is somewhat more aggressive an acceleration 210 and a deceleration 212, with an even more controlled profile section 214 therebetween. Here again, the curvature 216 affords this behavior from an initiation (or completion) point 218, through a boundary curvature 220 and the controlled spline curvature 222.

The modified splines illustrated in FIGS. 15 and 18 result from the combination of at least two different generators for the spline geometry. In particular, these two configurations transition between a cubic parabola curve at the onset of the curved track module to a fit spline at a transition point. The cubic parabola section will generally correspond to the accelerations and decelerations illustrated in FIGS. 16 and 19, with the fit section corresponding to the deceleration and other performance parameters therebetween. It may also be noted that these geometries include a segment of constant radius as indicated by the horizontal portion of the controlled profile segments indicated near the centers of FIGS. 16 and 19. In practice, such techniques may be utilized to modify the spline geometries to fit the overall envelope of the curves to desired constraints as with the flattened splines discussed above. Moreover, transitions of this type may be used to allow for the design of 90 degree curves that mate with one another and that are generally self-similar about a centerline. Similar spline modifications may be used for symmetrical transitions between 45 degree sections, 30 degree sections and any desired fractional curve.

As will be appreciated by those skilled in the art, the ability to accommodate specified envelope dimensions by adaptation of a modified spline geometry, and particularly one defined by multiple generators, is extremely useful in many applications. That is, even if a spline geometry, such as a clothoid shape, were used to define a curve or turn in such systems, the overall dimensions dictated by the full clothoid shape may constrain the other dimensions of the track layout. For example, to fully respect the geometry of an unmodified clothoid (or other spine shape), the length of the curved module(s), the spacing between the straight modules that join to the curved modules to form a loop or other shape will be constrained by the dimensions imposed by the curve shape. The present modified spline configurations allow for envelope dimensions to be specified, and the curved modules engineered with multiple generators to optimize or compromise performance with the space constraints and envelope dictates of the application.

Figure 21:
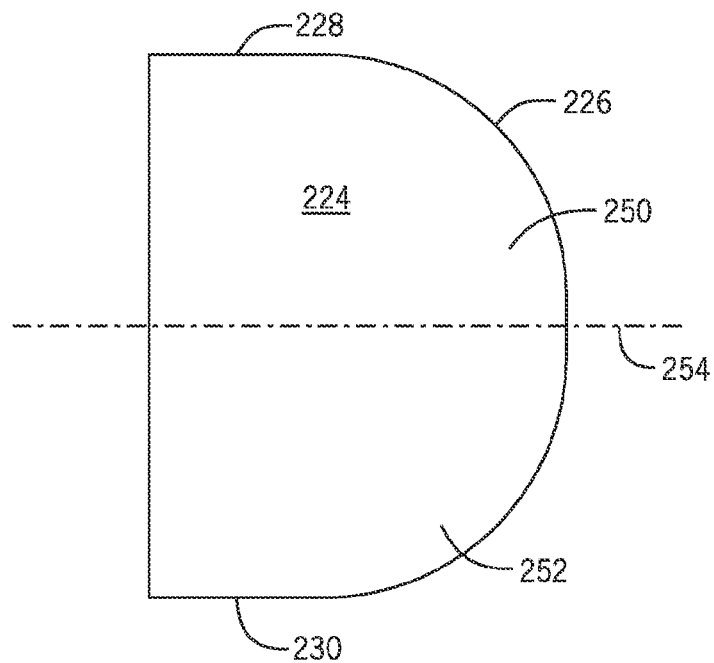
FIG. 21 is a schematic representation of a portion of a curved track module of a track assembly having another modified spline smoothed curve track geometry.
Figure 22:
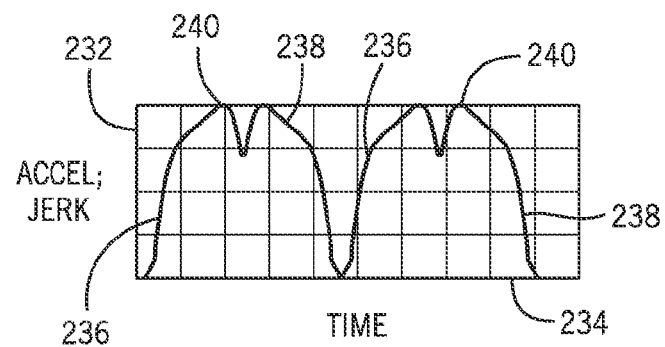
FIG. 22 is a graphical representation of linear acceleration of an object traveling from a straight track module to and along the curve track module of FIG. 21 of the track assembly.
Figure 23:
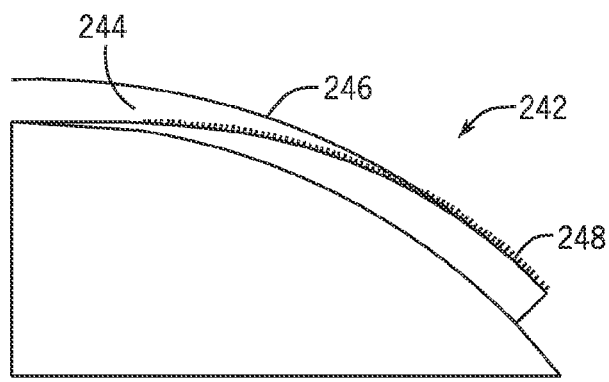
FIG. 23 is a schematic representation graphically depicting curvature of the curved track module of FIG. 21.

FIG. 21 illustrates a curved track module 224 having a further modified spline geometry 226. Here the track module is illustrated as completing a 180 degree turn from an entry end 228 to an exit end 230. The spline here is modified to transition between a straight section at the entry end 228 to a further straight section near the exit end 230, with a generally symmetrical motion profile therebetween. As indicated by the graphical representation of FIG. 22, the acceleration and jerk 232, plotted against time 234 indicate an acceleration 236 followed by a deceleration 238 near the center of the 180 degree turn. Thereafter, a substantially identical acceleration 236 is seen followed by a similar deceleration 238 near the exit end. Therebetween, controlled profiles 240 indicate inflected or bent accelerations and jerks that are provided by the combination of more than one generator for the spline. In this particular example, a cubic parabola at the entry and exit is transitioned to a fit spline between the entry and the midpoint of the 180 degree turn, with an identical cubic parabola being fit around the midpoint. This modified geometry provides the symmetrical acceleration and jerk characteristics illustrated in FIG. 22. The corresponding curvature 242 shown in FIG. 23 exhibits an initiation (or completion) 244 followed by a boundary curvature 246 and a controlled spline curvature 248. By allowing for the generally symmetrical geometry and corresponding motion profiles, the curved track modules may be made in 180 degree arrangements, or may be split about a centerline 254 (see FIG. 21) in which a first 90 degree module 250 is mated with a mirror-image 90 degree module 252, each having similar geometries and motion profiles. Here again, the modification of the spline geometry allows for control of these motion profiles, control of acceleration and jerk, control of loads and motor forces, and so forth.

Figure 24:
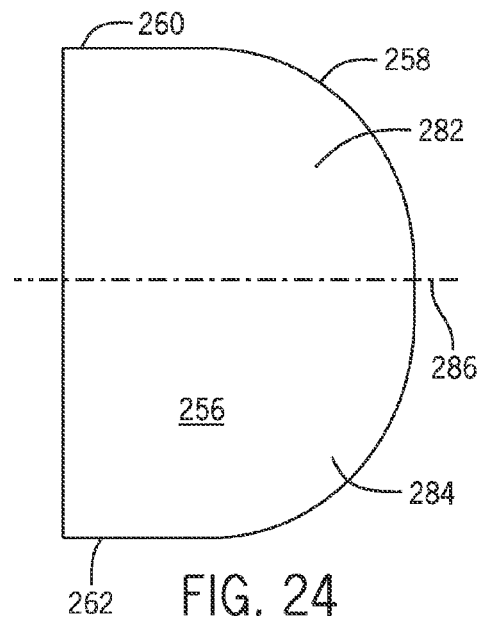
FIG. 24 is a schematic representation of a portion of a curved track module of a track assembly having another modified spline smoothed curve track geometry.
Figure 25:
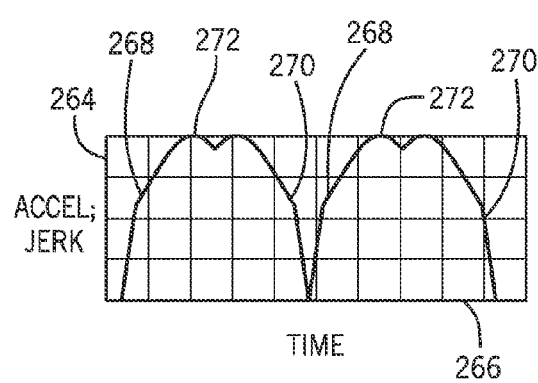
FIG. 25 is a graphical representation of linear acceleration of an object traveling from a straight track module to and along the curve track module of FIG. 24 of the track assembly.
Figure 26:
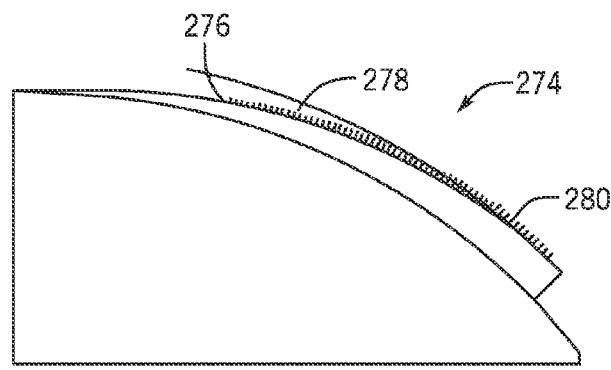
FIG. 26 is a schematic representation graphically depicting curvature of the curved track module of FIG. 25.

A further modified spline geometry is illustrated in FIG. 24 for a curved track module 256. The modified spline geometry 258 is here illustrated as forming a 180 degree curve from an entry end 260 to an exit end 262. Here again, the illustrated modified spline includes more than one generator, and in this case another cubic parabola near the entry and exit ends, transitioning to a fit spline therebetween, with a fixed constraint around a midpoint of the 180 degree curve. This configuration, and the previous modified spline may be thought of as a "straight-to-curved-to-straight" geometry from the ends 260 and 262 to the center point of the 180 degree curve. The motion profile, particularly the acceleration and the jerk 264 plotted against time 266 as illustrated in FIG. 25 is generally similar to that of the previous embodiment with accelerations 268, decelerations 270, bends or inflections in these accelerations and decelerations, with controlled profiles 272 therebetween. This profile is again the result of the curvature 274 illustrated in FIG. 26 from the initiation (or completion) point 276 through the boundary curvature 278 to the controlled profile 280. Such modified splines may be generated by inputting the initial generator, such as the cubic parabola, which may also form the exit to the geometry. A point therebetween may be fixed as a constraint, with the spline being fitted between the end of the first generator and the fixed point or points.

Figure 27:
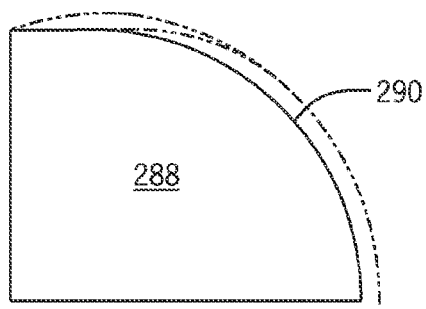
FIG. 27 is a schematic illustration showing of a portion of a curved track module of a track assembly having a modified spline smoothed curve track geometry.
Figure 28:
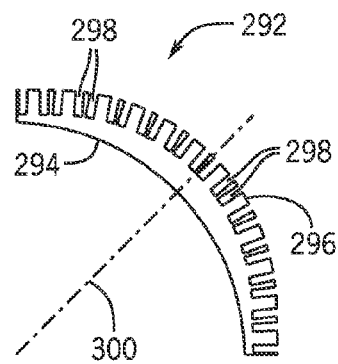
FIG. 28 is a top view of a motor stator section for a portion of the curved track module of FIG. 27.

As in the previous embodiment, this configuration may allow for mirror-image modules 282 and 284 as illustrated in FIG. 24, which are assembled about a centerline 286 with a smooth transition therebetween. A single portion of the module is illustrated in FIG. 27 as indicated by reference numeral 288. Reference numeral 288 may correspond to a housing or mounting structure that has a generally constant radius outer parameter 290 for receiving a motor stator or armature as illustrated in FIG. 28. As will be appreciated by those skilled in the art, the stator 292 may be formed of a plurality of magnetic sheets or laminates that are assembled to provide the desired magnetic and mechanical structures. Such laminates may be stamped and assembled, with any further machining performed prior to or after assembly. In this particular implementation, a circular mounting surface 294 is formed by stator laminates to allow for ease of mounting on the housing 288 of FIG. 27. The spline geometry is provided by the outer portion of the stator as indicated by reference numeral 296. The laminates here are formed to provide coils slots 298. These slots may be positioned to maintain desired spacings, desired overall arc lengths, and so forth in a consistent manner with the straight modules and any other curved modules of the system. It may also be noted that this particular configuration may allow for utilization of the same laminates, same stators, and same modules for one or more curved sections, with these either being simply moved to another position or flipped for mounting to provide the geometries and motion profiles discussed above. Moreover, in the embodiment illustrated in FIG. 28, the stator is symmetrical about a 45 degree symmetry line as indicated by reference numeral 300. This particularly may allow for flipping or repositioning of the same mechanical component for use in 90 (or fractional) degree segments. Similar symmetries may be provided at other angles, such as 30 degrees, 15 degrees, and so forth.

As discussed above, more than one generator may be used for some or all of the modified splines disclosed, and often one of these will be an equation that defines segment of the geometry, while another is a fit between this segment and one or more constrained points, arc lengths, and so forth. Optimized curves may thus be generated by creating an equation driven curve to define the lead-in geometry to control the jerk and acceleration at the transition from the straight to the curve. The lead-in segment (and the lead-out segment) may be, for example defined by cubic parabola functions. The remaining portion of the modified spline may transition from the endpoint of the equation-driven segment to a diameter that results in the correct motor length (or arc length, such as 400 mm at a 2.5 mm offset trace, currently 262.35 mm).

In some embodiments, a transition spline segment is made equal curvature and tangent at a transition point from the equation driven curve, and both curves are perpendicular to construction lines at the start and end of the curves. The tangent vector dimension (e.g., 160 mm), in a currently contemplated embodiment, was found iteratively by evaluating the curvature of the splines. The goal was to have the largest minimum radius of curvature in the transition region while maintaining as close as possible a consistent rate of change of curvature at the transition from the equation driven spline to the transition spline. The denominator of the equation driven spline curve can be increased in order to flatten the curve (reduce the rate of change of curvature). When the length is increased, the denominator may be increased to maintain the same rate of change of curvature.

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A controlled motion system comprising:
   a track assembly having a straight track module and a curved track module interconnected to form a continuous track, each module comprising a plurality of individually controlled electromagnet coils effective for creating electromagnetic fields; and
   a mover mounted for movement along the track and having magnetic reaction elements positioned that interact with the fields;
   wherein the curved track module comprises a modified spline geometry comprising at least two different adjacent non-constant radius spline segments having different generators.

2. The controlled motion system of claim 1, curved track module comprises a modified spline having an equation-generated segment and a transition-generated segment with a smooth transition between the equation-generated segment and the transition-generated segment.

3. The controlled motion system of claim 2, wherein the equation-generated segment comprises a clothoid curve.

4. The controlled motion system of claim 2, wherein the equation-generated segment comprises a cubic parabolic curve.

5. The controlled motion system of claim 1, wherein the modified spline geometry comprises a flattened region around a centerpoint of a 180 degree curve.

6. The controlled motion system of claim 1, wherein the curved track module comprises a 90 degree curve.

7. The controlled motion system of claim 1, wherein the curved track module comprises two self-similar, mirror image modules positioned side-by-side.

8. The controlled motion system of claim 7, wherein each curved track module comprises a 90 degree curve.

9. The controlled motion system of claim 1, wherein the curved track module comprises a 90 degree module with a modified spline geometry that is symmetrical about a 45 degree centerline.

10. The controlled motion system of claim 1, wherein each of the straight and curved track modules comprises drive circuitry for controlling movement of the mover along the track assembly by energization of the coils.

11. The controlled motion system of claim 1, wherein the electromagnetic coils are provided around a periphery of the modules.

12. The controlled motion system of claim 1, wherein the electromagnetic coils are provided generally in a plane near a top or bottom surface of the modules.

13. A controlled motion system comprising:
    a curved track module interconnectable with other track modules to form a continuous track and comprising a plurality of individually controlled electromagnet coils effective for creating electromagnetic fields for displacing a mover along the curved track module;

wherein the curved track module comprises a modified spline geometry comprising at least two different adjacent non-constant radius spline segments having different generators.

14. The controlled motion system of claim 13, curved track module comprises a modified spline having an equation-generated segment and a transition-generated segment with a smooth transition between the equation-generated segment and the transition-generated segment.

15. The controlled motion system of claim 14, wherein the equation-generated segment comprises a clothoid curve.

16. The controlled motion system of claim 14, wherein the equation-generated segment comprises a cubic parabolic curve.

17. The controlled motion system of claim 13, wherein the modified spline geometry comprises a flattened region around a centerpoint of a 180 degree curve.

18. The controlled motion system of claim 13, wherein the curved track module comprises a 90 degree curve.

19. The controlled motion system of claim 13, wherein the curved track module comprises a 90 degree module with a modified spline geometry that is symmetrical about a 45 degree centerline.

20. A controlled motion system comprising:
a curved track module interconnectable with other track modules to form a continuous track and comprising a plurality of individually controlled electromagnet coils effective for creating electromagnetic fields for displacing a mover along the curved track module;
wherein the curved track module comprises a modified spline geometry comprising multiple adjacent non-constant radius spline segments having different generators, and wherein the curved track module comprises a 90 degree module with a modified spline geometry that is symmetrical about a 45 degree centerline.

* * * * *